Nov. 11, 1941.   K. A. HARMON ET AL   2,262,531
IMPULSE COUPLING
Filed May 6, 1939   2 Sheets-Sheet 1
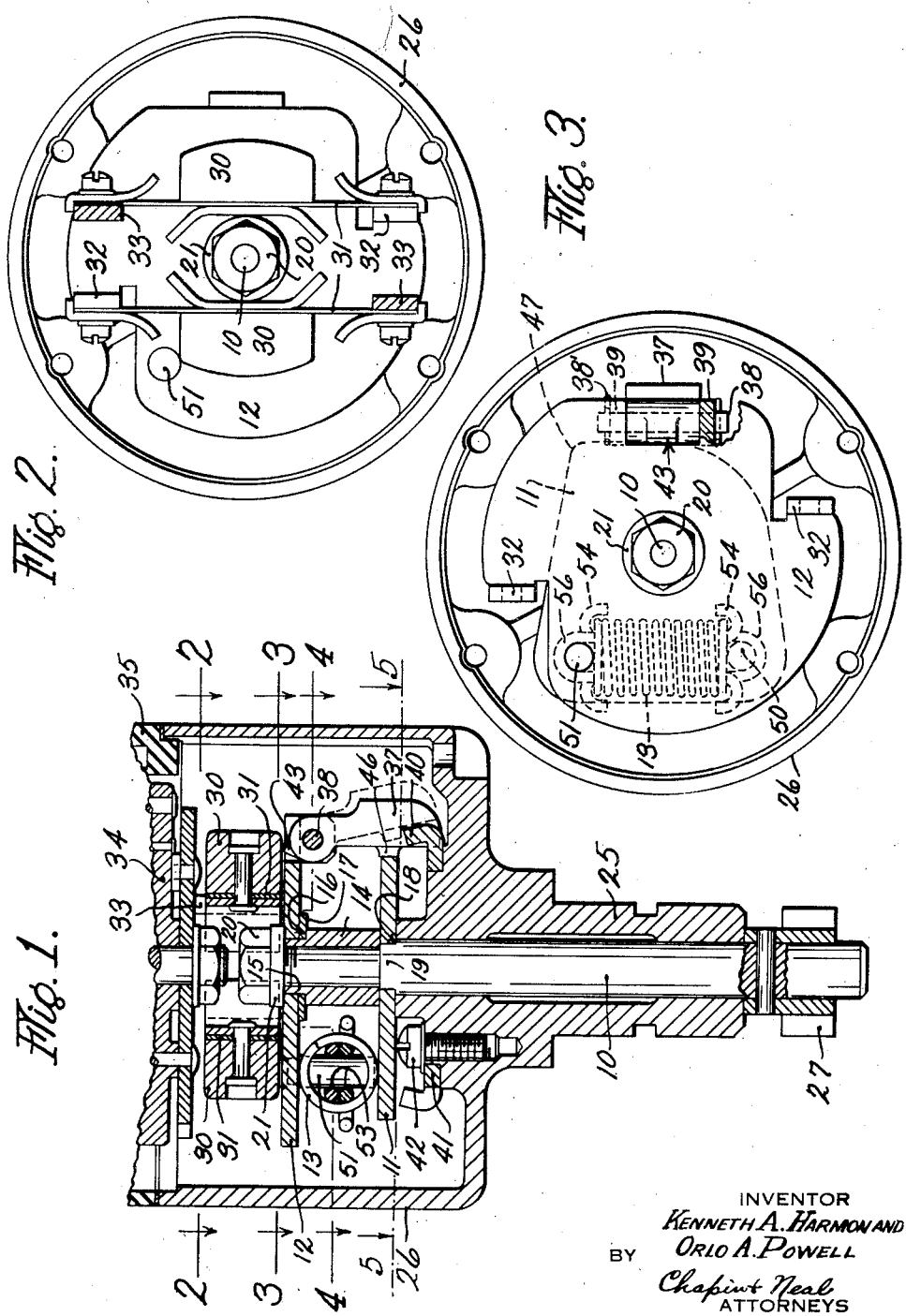
INVENTOR
KENNETH A. HARMON AND
ORLO A. POWELL
BY Chapin & Neal
ATTORNEYS Nov. 11, 1941.   K. A. HARMON ET AL   2,262,531
IMPULSE COUPLING
Filed May 6, 1939   2 Sheets-Sheet 2
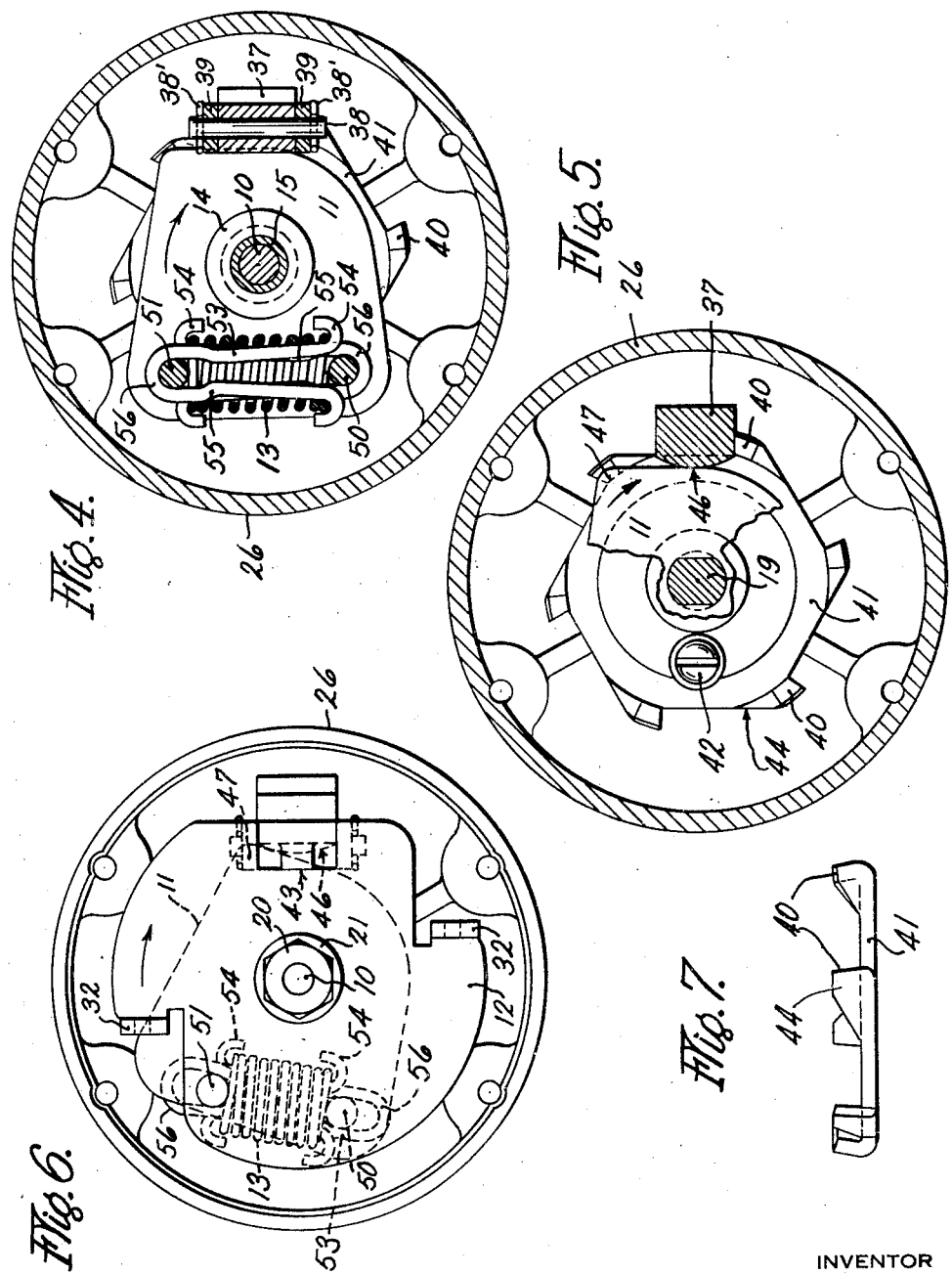
INVENTOR
KENNETH A. HARMON AND
BY ORLO A. POWELL
Chapin + Neal
ATTORNEYS Patented Nov. 11, 1941

2,262,531

UNITED STATES PATENT OFFICE 2,262,531

IMPULSE COUPLING

Kenneth A. Harmon, Longmeadow, and Orlo A. Powell, West Springfield, Mass., assignors to Wico Electric Company, West Springfield, Mass., a corporation of Massachusetts Application May 6, 1939, Serial No. 272,200

3 Claims. (Cl. 171—209)

This invention relates to improvements in impulse couplings, such as are used for driving a magneto rotor to impart intermittently thereto on slow rotation of the driving means, a series of rapid impulse movements.

The invention has for an object to provide in an impulse coupling a coil spring, acting as the impulse spring, with novel connections between it and the driving and driven members, so arranged as to fix and determine the normal relative position of said members and so arranged that the impulse spring may also serve as a cushioning or shock absorbing means, being subjected at the end of the impulse movement to the same kind of stress as it was during the "wind up" movement.

The invention has for another object to provide a pushing connection and a pulling connection from the driving member to opposite ends of the spring and to provide between the driven member and the spring a pushing connection, extending to that end of the spring which is engaged by the above-named pulling connection and a pulling connection, extending to that end of the spring which is engaged by the first-named pushing connection, whereby the spring will be compressed on relative movement of said members in either direction.

Other objects of the invention are to provide an impulse coupling which is relatively inexpensive to manufacture; which is compact; and which has a minimum of parts each of simple construction and designed to provide for long wear.

The invention will be disclosed with reference to the accompanying drawings, in which:

Fig. 1 is a fragmentary sectional elevational view of a magneto having associated therewith an impulse coupling embodying the invention;

Figs. 2, 3, 4, and 5 are sectional plan views, taken on the lines 2—2, 3—3, 4—4, and 5—5, respectively of Fig. 1;

Fig. 6 is a view taken similarly to Fig. 3 but showing certain parts in different relative positions; and Fig. 7 is a side elevational view of the stop ring.

The invention has been shown for illustrative purposes in connection with a magneto of the type disclosed in the copending application of Kenneth A. Harmon, Serial No. 253,025, filed January 26, 1939. Obviously, the invention is capable of other applications and is not to be limited to the one specific application disclosed herein.

The coupling includes a driving shaft 10 (Fig. 1), having mounted thereon driving and driven plates 11 and 12, respectively—such plates being interconnected by an impulse spring 13. The driving plate 11 is fixed to shaft 10 in any suitable way, and the driven plate is mounted to turn freely relatively to the shaft. As shown, these two plates are separated by a spacing sleeve 14, one end of which rests against the top face of plate 11 and the other end of which has a portion 15 of reduced diameter forming a shoulder 16. A washer 17 encompasses part 15 and rests on shoulder 16 and the driven plate 12 fits on part 15 as a bearing and rests against the washer 17. The shaft 10 has a shoulder 18 forming a seat for plate 11 and adjacent thereto a portion 19 of non-circular section which is engaged in an opening of the same size and shape on plate 11. Above the portion 19 the shaft is cylindrical and extends through the sleeve 15 and projects beyond the same with a threaded outer end. A washer 21, clamped by a nut 20 against the outer end of the stud portion 15, retains the driven plate 12 in position but leaves the plate free to turn on stud 15. The nut also serves through sleeve 14 to clamp the driving plate against seat 18.

The shaft 10 is rotatably mounted in the hub 25 of the cup-shaped lower casing member 26 of a magneto of the type shown in the above application. A driving gear 27 fixed to the lower end of shaft 10 cooperates with plate 11 to hold the shaft against undue axial displacement. The magneto is adapted to be mounted on an internal combustion engine, the hub 25 fitting into a socket on the engine in place of the usual timer distributor unit and the gear 27 being driven by said engine in any suitable way, in this case at half the speed of the engine crankshaft.

The impulse coupling is located inside and in the lower part of casing 26 and, in this particular case, an automatic spark advance mechanism is located immediately above the impulse coupling and also inside the casing 26. The driven plate is connected to the rotor of the magneto through the intermediary of said mechanism, which includes governor weights 30 (see also Fig. 2), fixed one to each of a pair of flat springs 31. The ends of each spring 31 are fixed one to a lug 32 fixed to and upstanding from the driven plate 12 and one to a lug 33 fixed to and depending from the magneto rotor, a portion of which is indicated at 34. A casing 35 cooperates with casing 26 to complete the housing for the magneto.

The driven plate 12 has mounted thereon one or more weighted pawls 37 (Figs. 1 and 3). In this case, one such pawl is all that is needed but if shaft 10 were mounted horizontally, it would be usual to provide at least two such pawls, all as is well understood by those skilled in the art. The pawl 37 is mounted to swing freely on a pivot pin 38, the ends of which are mounted one in each of a pair of spaced lugs 39 depending from plate 12. The hub of pawl 37 fits between said lugs (Fig. 4) and pin 38 is held in place by cotter pins 38' or in any other suitable way. The pawl hangs downwardly from plate 12—the weight of the pawl tending to hold it in the vertical position shown by full lines in Fig. 1. When thus positioned, the lower end of pawl 37 lies in the path of one of a series of angularly spaced stops 40 (Fig. 5), fixed to and upstanding from a ring 41. This ring is fixed as by one or more screws 42, to the base of casing 26 preferably in a manner to enable angular adjustment of the ring relatively to shaft 10. The pawl is movable outwardly by centrifugal force into a position such as shown by dotted lines in Fig. 1—outward movement of the pawl being limited by the engagement of a stop 43 on the hub of the pawl with plate 12. The stop lugs 40 are made like ratchet teeth (see Fig. 7), having sloping rear sides 44 which allow the pawl 37 to pass the lugs on reverse rotation of shaft 10.

On the inner face of pawl 37 is a rounded projection 46 (Fig. 5) located at the same level as the driving plate 11 (Fig. 1) and adapted to be engaged by a cam portion 47 (Fig. 5), formed on plate 11, to cause the pawl to be disengaged from a stop lug 40 at the proper time to "trip" the driven plate 12, releasing it for movement under the impulse from the previously stressed impulse spring 13. The parts are shown in Figs. 1 to 5 in the relative positions which they occupy at the start of the "wind up" or spring-stressing operation preparatory to a driving impulse. These are the normal positions. Fig. 6 shows the parts in the relative positions which they occupy at the end of the "wind up" operation and at about the time when the pawl 37 is to be released from stop 40 to initiate a driving impulse.

This impulse spring is a coil spring and it is mounted in a simple but novel way so that on the "winding" or "unwinding" movements of plates 11 and 12, the one relatively to the other, the spring will be compressed. The spring is located between two pins 50 and 51, the first being fixed to and upstanding from driving plate 11 and the second being fixed to and depending from driven plate 12. On clockwise rotation of shaft 10, when plate 12 is arrested by the engagement of pawl 37 with any one of the stops 40, the pin 51 will be stationary while pin 50 advances toward it, compressing the spring between the two pins as shown in Fig. 6.

Within spring 13 are two connectors 53 (best shown in Fig. 4), each of like construction. In general, each connector is approximately U-shaped and has outturned hooks 54, one on the outer end of each arm 55 of the U. The two guides are slipped into the spring 13, one from each end thereof, until the hooks 54 engage over the adjacent end coil of the spring at diametrically opposite points thereon. Then the spring is compressed until both of the rounded end portions 56 of the connectors project beyond the ends of the springs far enough to allow the pins 50 or 51, as the case may be, to be slipped in place between such end 56 and the adjacent end coil of spring 13. With these connectors 53 in place, as shown, it will be clear that if either pin 50 or 51 is pulled away from the other, the spring will be compressed between the two pairs of hooks 54. The parts 55 closely fit the inner periphery of the coils of springs 13 and serve as guides, preventing the spring, when compressed, from undue lateral deflection.

The operation of the invention will next be described. The device, as herein disclosed, is intended for use with a six-cylinder, four-cycle internal combustion engine, shaft 10 being driven therefrom in a clockwise direction at half crankshaft speed and the ring 41 having six stops 40 to provide for six impulses per revolution of shaft 10. On starting or on low engine speeds, the driving and driven members turn in unison until the pawl 37 engages one of the stops 40, whereupon the driven member 12 ceases to turn and the continued rotation of the driving member 11 causes the impulse spring 13 to become compressed between the pins 50 and 51. Stressing of this spring, or the so-called "wind up" movement, continues for approximately 20 degrees movement of member 11. The parts then occupy the positions shown in Fig. 6 and the cam 47 is about to engage the part 46 on the pawl 37 and move it radially outward to disengage the pawl from the stop 40 with which it has been engaged. Thereupon, the spring 13 expands and imparts a quick impulse to the drive member 12 and the rotor secured thereto. Member 12 rapidly advances until it overtakes the driving member 11 and the heavy magnetic rotor, once set in motion, has considerable momentum, which tends to carry the driven member ahead of its proper position with relation to the driving member. This overthrow of the driven member is checked in a cushioned manner by the same spring 13 which imparts the driving impulse. The pin 51, moving away from pin 50, pulls on the non-adjacent end of spring 13 and causes it to be compressed between the hooked ends 54 of connectors 53. The driven member 12 is thus restrained and brought into its proper and normal position with relation to the driving member 11 without shock, the energy of the moving rotor being absorbed by the same spring which originally imparted the energy to the rotor. Rotation of the members 11 and 12 in unison continues until the pawl 37 engages the next stop 40, whereupon the described operation is repeated. Repeated impulses are imparted to the driven member 12 until it acquires enough speed to cause pawl 37 to be moved radially outward by the action of centrifugal force far enough to clear the stops 40.

It is to be noted that the normal relative position of members 11 and 12 is fixed by the length of the connectors 53. The spring 13 is applied between pins 50 and 51 under some initial stress and, pressing on the adjacent sides of the pins, would move them apart except for the fact that the spring is also made to act equally on the opposite side of each pin through the connectors 53. The pins 50 and 51 are thus held in a certain normal relationship, as shown in Fig. 3, and, if moved out of such relationship, the pins will automatically resume such relationship and come to rest in a cushioned, shock-absorbing manner. This is very important as substantially lessening if not entirely avoiding breakage of parts due to repeated impingement of parts without any means for cushioning the blows.

The invention provides a structure which may be manufactured in quantities at low unit cost.

The parts are few in number and each simple in construction. No unusual or difficult manufacturing operations are required. The device is also of light weight and exceedingly compact as is desirable for such uses as that herein disclosed wherein the magneto is intended to be mounted in place of the usual timer-distributor unit in an automobile engine. The use of a simple coil spring as the impulse spring is important from the standpoint of manufacturing economy. Also, the spring being wholly unenclosed (in prior art couplings the spring is often located in closely fitting holes or grooves), has a much longer life because of the lack of any chance for wear by rubbing on adjacent parts. The structure also is efficient and although of small dimensions it nevertheless is effective to produce a substantial number of impulses per revolution.

The invention has been disclosed herein in an embodiment at present preferred but the scope of the invention is defined by the appended claims rather than by the foregoing description.

What we claim is:

1. In an impulse coupling, having driven and driving members mounted in coaxial and axially-spaced relation, a coil spring mounted between said members with its axis disposed in a plane at right angles to the common axis of said members, a pushing connection from the driving member to one end of said spring and a pulling connection from the driving member to the other end of said spring, a pushing connection from the driven member to the second-named end of said spring and a pulling connection from the driven member to the first-named end of said spring, a fixed stop, a weighted pawl pivotally supported from the driven member movable radially inward on slow speeds to engage said stop and arrest the driven member but movable outwardly to clear said stop on higher speeds, means on the driving member to disengage said pawl from said stop after a predetermined angular advance of the driving member, whereby said spring, having been compressed between said pushing connections during said advance, expands and drives said driven member rapidly ahead with an impulse, said spring being compressible through said pulling connections to absorb the shock at the end of said impulse movement.

2. In an impulse coupling, having driven and driving members mounted in coaxial and axially-spaced relation, a coil spring mounted between said members with its axis disposed in a plane at right angles to the common axis of said members, a pushing connection from the driving member to one end of said spring and a pulling connection from the driving member to the other end of said spring, a pushing connection from the driven member to the second-named end of said spring and a pulling connection from the driven member to the first-named end of said spring, a fixed stop, a weighted pawl pivotally mounted on the driven member and movable on relatively slow speeds of said driven member into the path of said stop and engageable with the latter to arrest the driven member and movable on relatively high speeds of said driven member out of the path of said stop, means on the driving member to disengage said pawl from said stop after a predetermined angular advance of the driving member, whereby said spring, having been compressed between said pushing connections during said advance, expands and drives said driven member rapidly ahead with an impulse, said spring being compressible through said pulling connections to absorb the shock at the end of said impulse movement.

3. In an impulse coupling, driving and driven members mounted in coaxial and axially-spaced relation and having parallel pins fixed one on each member and extending toward but not to the other member in a direction parallel to the common axis of said members, and an impulse spring in the form of a coil spring located between and having its ends abutting one with each of said pins, connectors one for each pin, each connector including a U-shaped part looped around its pin and cooperating with the adjacent end coil of said spring to completely encompass its pin, spaced extensions from said part passing through said spring from said end to the opposite end thereof and each engaging the inner periphery of the coils thereof, said extensions having terminal ends hooked over the end coil of said spring at the last-named end thereof, a fixed stop, a weighted pawl pivotally mounted on the driven member and movable on relatively slow speeds thereof into the path of said stop whereby to arrest the driven member, said pawl being movable on relatively high speeds of the driven member out of the path of said stop, means on the driving member for disengaging said pawl from said stop after a predetermined angular advance of the driving member whereby said spring is compressed between said pins during said advance and subsequently expands and drives the driven member rapidly ahead with an impulse, said spring also being compressible between the hooked ends of said connectors as the pins separate at the end of the impulse movement to absorb the shock at the end of such movement.

KENNETH A. HARMON.
ORLO A. POWELL.